(12) United States Patent
Hu

(10) Patent No.: US 12,413,639 B2
(45) Date of Patent: Sep. 9, 2025

(54) DATA PROCESSING METHOD, AND NETWORK ELEMENT AND COMPUTER-READABLE STORAGE MEDIUM

(71) Applicant: ZTE CORPORATION, Shenzhen (CN)

(72) Inventor: Ting Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/578,534

(22) PCT Filed: May 7, 2022

(86) PCT No.: PCT/CN2022/091527
§ 371 (c)(1),
(2) Date: Jan. 11, 2024

(87) PCT Pub. No.: WO2023/005326
PCT Pub. Date: Feb. 2, 2023

(65) Prior Publication Data
US 2024/0388624 A1 Nov. 21, 2024

(30) Foreign Application Priority Data
Jul. 26, 2021 (CN) .......................... 202110842794.6

(51) Int. Cl.
*H04L 67/1095* (2022.01)
*G06F 9/46* (2006.01)

(52) U.S. Cl.
CPC .......... *H04L 67/1095* (2013.01); *G06F 9/465* (2013.01)

(58) Field of Classification Search
None
See application file for complete search history.

(56) References Cited

U.S. PATENT DOCUMENTS 10,445,170 B1 * 10/2019 Subramanian ......... G06N 20/10
10,986,408 B1 * 4/2021 Randhawa ......... H04N 21/4668
(Continued)

FOREIGN PATENT DOCUMENTS

| CN | 102081625 A | 6/2011 |
| CN | 102624583 A | 8/2012 |

(Continued)

OTHER PUBLICATIONS

Abdelhafiz, "Distributed Database Using Sharding Database Architecture", Dec. 16, 2020, IEEE, 2020 IEEE Asia-Pacific Conference on Computer Science and Data Engineering (CSDE) (2020, pp. 1-17) (Year: 2020).*

(Continued)

*Primary Examiner* — Davoud A Zand
(74) *Attorney, Agent, or Firm* — Vivacqua Crane, PLLC

(57) ABSTRACT

Disclosed are a data processing method, a network element and a computer-readable storage medium. The data processing method may include: receiving first request information, wherein the first request information is used to request data information corresponding to a first object; receiving second request information, wherein the second request information is used to request data information corresponding to a second object; in response to presence of an intersection object between the first object and the second object, determining target data information which needs to be acquired from a server according to the intersection object; and requesting the target data information from the server.

19 Claims, 11 Drawing Sheets

(56) References Cited

U.S. PATENT DOCUMENTS

2021/0173888 A1    6/2021  Flack et al.
2021/0397374 A1*  12/2021  Agarwal .................. G06F 9/542
2022/0075793 A1*   3/2022  Jezewski ................. G06N 5/04
2022/0245513 A1*   8/2022  Wang ................. H04L 67/1097

FOREIGN PATENT DOCUMENTS

CN    108536793 A    9/2018
CN    110020383 A    7/2019

OTHER PUBLICATIONS

European Patent Office. Extended European Search Report for EP Application No. 22847941.6, mailed Sep. 19, 2024, pp. 1-12.
International Searching Authority. International Search Report and Written Opinion for PCT Application No. PCT/CN2022/091527 and English translation, mailed Jul. 6, 2022, pp. 1-10.
3GPP Technical Specification Group Service and System Aspects. "Architecture enhancements for 5G System (5GS) to support network data analytics services (Release 17)," 3GPP TS 23.288, v. 17.1.0, 2021.
Industrial Property Cooperation Center (IPCC). Search Report for JP Application No. 2024-501173 and English translation, mailed Dec. 9, 2024, pp. 1-50.
Japan Patent Office. Notice of Reasons for Refusal for JP Application No. 2024-501173 and English translation, mailed Jan. 7, 2025, pp. 1-6.

* cited by examiner

DATA PROCESSING METHOD, AND NETWORK ELEMENT AND COMPUTER-READABLE STORAGE MEDIUM

CROSS-REFERENCE TO RELATED APPLICATION

This application is a national stage filing under 35 U.S.C. § 371 of international application number PCT/CN2022/091527, filed May 7, 2022, which claims priority to Chinese patent application No. 202110842794.6 filed Jul. 26, 2021. The contents of these applications are incorporated herein by reference in their entirety.

TECHNICAL FIELD

The present disclosure relates to the technical field of communication, and more particularly, to a data processing method, a network element and a computer-readable storage medium.

BACKGROUND

A Network Data Analytics Function (NWDAF) is a Network Function (NF) proposed as a network element in the 5th Generation Mobile Communication Technology Core Network (5GC) system. The NWDAF can receive request information of subscribing or querying data analytics results initiated by other NFs, and then request to acquire relevant data corresponding to the request information from NFs or a network element of Operation Administration and Maintenance (OAM) that provide original data.

However, in some cases at present, the NWDAF may respectively request data processing from the NFs or the OAM that provide the original data according to the request information initiated by different initiators, and all processing is independent and isolated from one another. Therefore, when the request information initiated by different initiators is duplicated in content, the consumption of resources of the NWDAF will be increased, which is not conducive to the rational utilization of the resources of the NWDAF.

SUMMARY

The following is an overview of the subject described in detail herein. This overview is not intended to limit the scope of protection of the claims.

Embodiments of the present disclosure provide a data processing method, a network element and a computer-readable storage medium.

In accordance with a first aspect of the present disclosure, an embodiment provides a data processing method, including: receiving first request information, where the first request information is used to request data information corresponding to a first object; receiving second request information, where the second request information is used to request data information corresponding to a second object; in response to presence of an intersection object between the first object and the second object, determining target data information which needs to be acquired from a server according to the intersection object; and requesting the target data information from the server.

In accordance with a second aspect of the present disclosure, an embodiment provides a network element, including a memory, a processor, and a computer program stored in the memory and runnable on the processor, where the computer program, when executed by the processor, causes the processor to implement the data processing method as described in the first aspect.

In accordance with a third aspect of the present disclosure, an embodiment further provides a computer-readable storage medium, storing a computer-executable instruction which, when executed by a processor, causes the processor to implement the above data processing method.

Other features and advantages of the present disclosure will be set forth in the following description, and will be partly apparent from the description or understood by implementing the present disclosure. The objects and other advantages of the present disclosure can be realized and obtained by the structure particularly pointed out in the description, claims and drawings.

BRIEF DESCRIPTION OF DRAWINGS

The drawings are provided for a further understanding of the technical schemes of the present disclosure, and constitute a part of the description. The drawings and embodiments of the present disclosure are used to illustrate the technical schemes of the present disclosure, and do not constitute a limitation to the technical schemes of the present disclosure.

DETAILED DESCRIPTION

In order to make the objects, technical schemes and advantages of the present disclosure clear, the present disclosure will be further described in detail in conjunction with the drawings and embodiments. It should be understood that the specific embodiments described here are only used to illustrate the present disclosure, and are not intended to limit the present disclosure.

It is to be noted, although logical orders have been shown in the flowcharts, in some cases, the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a data processing method, a network element and a computer-readable storage medium. When receiving first request information used to request data information corresponding to a first object and receiving second request information used to request data information corresponding to a second object, it is judged whether there is an intersection object between the first object and the second object first, if there is an intersection object between the first object and the second object, target data information which needs to be acquired from a server is determined according to the intersection object, and the target data information is requested from the server. Since in the case where there is an intersection object between the first object and the second object, target data information which needs to be acquired from a server is determined according to the intersection object first, and then the target data information is requested from the server, it is unnecessary to request data information from the server respectively for the first request information and the second request information. Therefore, the number of times of requesting data information from the server can be reduced, thereby reducing the consumption of resources and enabling the resources to be reasonably utilized.

The embodiments of the present disclosure will be further illustrated in conjunction with the drawings.

Figure 1:
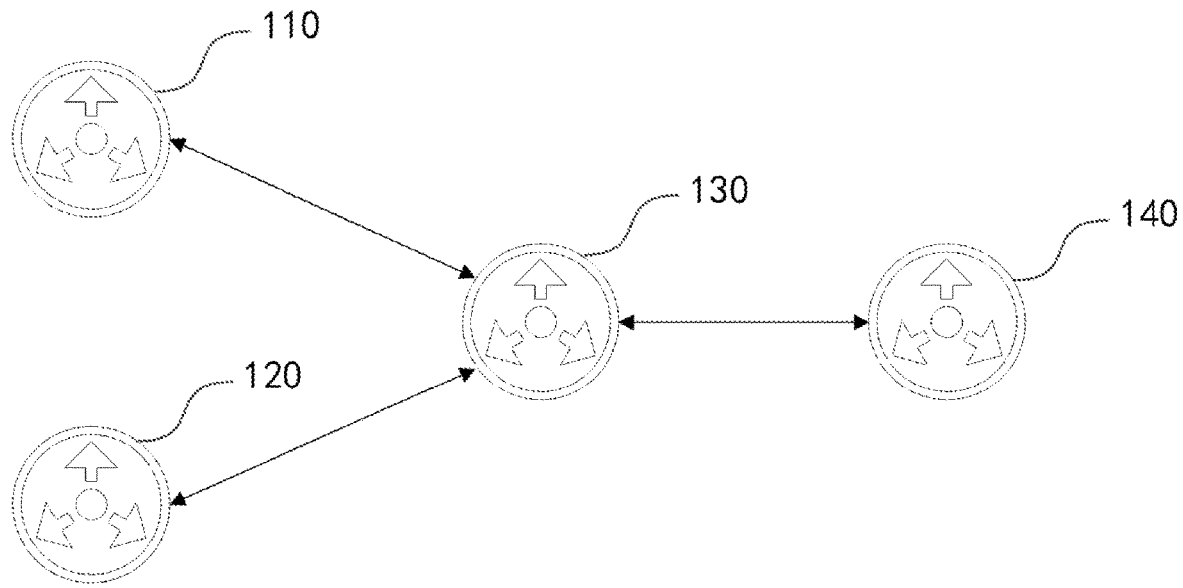
FIG. 1 is a schematic diagram of a system architecture for performing a data processing method provided by an embodiment of the present disclosure.

As shown in FIG. 1, FIG. 1 is a schematic diagram of a system architecture for performing a data processing method provided by an embodiment of the present disclosure. In an example of FIG. 1, the system architecture includes a first network element 110, a second network element 120, a third network element 130 and a server 140. The first network element 110 and the second network element 120 are both service consumers, the third network element 130 is an NF with a data collection function and a data analytics function, and the server 140 is a data provider. The first network element 110 and the second network element 120 are respectively communicatively connected to the third network element 130, and the third network element 130 is communicatively connected to the server 140.

According to different application scenarios, the first network element 110 and the second network element 120 may be different NFs, such as a Session Management Function (SMF), a Network Exposure Function (NEF), an Application Function (AF), and the like, which will not be specifically limited in this embodiment.

According to different application scenarios, the server 140 may be an OAM or a different NF, such as a Network Repository Function (NRF), an Access and Mobility Management Function (AMF), an SMF, an AF, and the like, which will not be specifically limited in this embodiment.

The third network element 130 may be an NWDAF or other NFs with a data collection function and a data analytics function, which will not be specifically limited in this embodiment.

The third network element 130 has at least the following functions:
(1) receiving a subscription or query initiated by the first network element 110 or the second network element 120 for a result of expected data analytics, where the expected data analytics may be at least one of data statistical analysis or data prediction analytics, and the result may be NF load data, slice load data, network load data, User Equipment (UE) data or the like;
(2) requesting relevant network data or UE data from the server 140; and
(3) analyzing the data acquired from the server 140, for example, training a machine learning model based on an Artificial Intelligence (AI) algorithm and the acquired data, and finally outputting a prediction result.

It should be noted that when the expected data analytics is data statistical analysis, the third network element 130 may output a statistical result based on historical data saved by the third network element 130; and when the expected data analytics is data prediction analytics, the third network element 130 may perform prediction processing on relevant data using the AI algorithm and output a prediction result. When the third network element 130 receives a subscription request, the third network element 130 needs to carry a relevant analytics result in notification information fed back to an initiator of the subscription request. When the third network element 130 receives a query request, the third network element 130 may carry a relevant analytics result in a query response fed back to an initiator of the query request without performing subsequent notification flows.

In an implementation, when the first network element 110 and the second network element 120 successively subscribe to future load prediction results of a same target NF instance from the third network element 130, the third network element 130 may merge data of the target NF instance, save only one copy of data corresponding to the target NF instance, and do not initiate a duplicate subscription request to the server 140. In this way, the initiation number of times of subscription requests can be reduced, thus reducing the consumption of resources and enabling the resources to be utilized reasonably.

In an implementation, when the first network element 110 subscribes to a future load prediction result of a target NF instance from the third network element 130 and specifies to collect data once every one minute, the third network element 130 subscribes to a load change notification message of the target NF instance from the server 140 and saves load data acquired from the server 140 once every one minute. When the second network element 120 subscribes to a future load prediction result of the target NF instance from the third network element 130 and specifies to collect data once every two minutes, the third network element 130 does not initiate a duplicate subscription request about the load change notification message of the target NF instance to the server 140, but samples the acquired load data once every two minutes, and uses the obtained sampled data as the load data corresponding to the subscription request initiated by the second network element 120.

In an implementation, after the first network element 110 subscribes to a future load prediction result of one target NF instance from the third network element 130, and the second network element 120 subscribes to load prediction results of all NF instances of the same type as the target NF instance from the third network element 130, the third network element 130 may first initiate a service discovery request to the server 140 to acquire identification information of all NF instances of the same type as the target NF instance, then determine identification information that does not exist in the third network element 130 according to the identification information of all NF instances of the same type as the target NF instance and the identification information of the target NF instance, and then request the server 140 for a load prediction result corresponding to the identification information that does not exist in the third network elements 130.

The system architecture and application scenarios described in the embodiments of the present disclosure are used to illustrate the technical schemes in the embodiments of the present disclosure clearly, and do not constitute a limitation to the technical schemes provided by the embodiments of the present disclosure. Those having ordinary skills in the art may know that, with the evolution of system architectures and the emergence of new application scenarios, the technical schemes provided by the embodiments of the present disclosure are also applicable to similar technical problems.

Those having ordinary skills in the art may understand that the system architecture shown in FIG. 1 does not constitute a limitation to the embodiments of the present disclosure and may include more or less components than shown, or combinations of certain components, or different component arrangements.

Based on the above system architecture, various embodiments of the data processing method of the present disclosure are proposed below.

Figure 2:
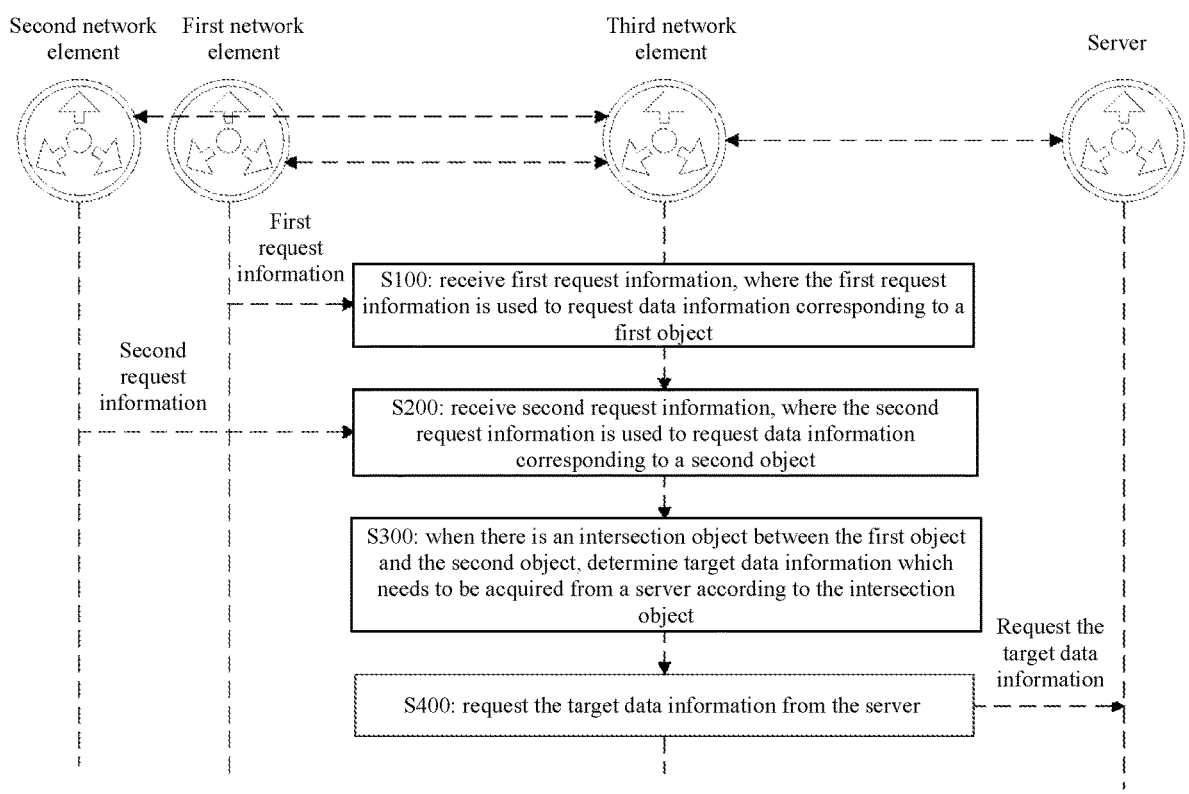
FIG. 2 is a flowchart of a data processing method provided by an embodiment of the present disclosure.

As shown in FIG. 2, FIG. 2 is a flowchart of a data processing method provided by an embodiment of the present disclosure. The data processing method may be applied to an NF with a data collection function and a data analytics function, for example, may be applied to the third network element 130 in the system architecture shown in FIG. 1. The data processing method may include, but not limited to, the following steps S100, S200, S300 and S400.

In the step of S100, first request information is received, where the first request information is used to request data information corresponding to a first object.

It should be noted that the first object may be a single object or a set of objects, which will not be specifically limited in this embodiment. When the first object is a set of objects, the first object may include more than two sub-objects, where the sub-objects have the same object type. In an implementation, the first object may be a User Plane Function (UPF).

It should be noted that the data information corresponding to the first object may be statistical information of historical data of the first object in a certain historical period of time, the data information of the first object at a current moment, and the predicted data information of the first object in a certain future period of time, which will not be specifically limited in this embodiment.

It should be noted that the first request information may be the request information sent by the first network element 110 as shown in FIG. 1.

In the step of S200, second request information is received, where the second request information is used to request data information corresponding to a second object.

It should be noted that the second object may be a single object or a set of objects, which will not be specifically limited in this embodiment. When the second object is a set of objects, the second object may include more than two sub-objects, where the sub-objects have the same object type. In an implementation, the second object may be a UPF.

It should be noted that the data information corresponding to the second object may be statistical information of historical data of the second object in a certain historical period of time, the data information of the second object at a current moment, and predicted data information of the second object in a certain future period of time, which will not be specifically limited in this embodiment.

It should be noted that the second request information may be the request information sent by the second network element 120 as shown in FIG. 1.

In the step of S300, when there is an intersection object between the first object and the second object, target data information which needs to be acquired from a server is determined according to the intersection object.

In this step, since the first request information used to request data information corresponding to the first object is received in step S100, and the second request information used to request data information corresponding to the second object is received in step S200, it can be determined whether there is an intersection object between the first object and the second object. When there is an intersection object between the first object and the second object, target data information which needs to be acquired from the server is determined according to the intersection object, such that target data information can be requested from the server in a subsequent step, thereby completing data acquisition requests initiated by an initiator of the first request information and an initiator of the second request information.

It should be noted that an intersection refers to a set composed of common element(s) of two sets. For example, supposing there is a set A and a set B, then a set composed of the same element(s) belonging to the set A and set B is an intersection of the set A and set B. In an implementation, when the first object and the second object are both single objects, or when the first object and the second object are both object sets and the first object and the second object are identical, it means that the first object (or the second object) is the intersection object. In this case, the data information (such as statistical information, predicted data information or the like) corresponding to the first object (or the second object) is the target data information which needs to be acquired from the server. When the first object is a single object and the second object is an object set, it means that the first object is the intersection object. In this case, the data information (such as statistical information, predicted data information or the like) corresponding to the second object is the target data information which needs to be acquired from the server. When the second object is a single object and the first object is an object set, it means that the second object is the intersection object. In this case, the data information (such as statistical information, predicted data information or the like) corresponding to the first object is the target data information which needs to be acquired from the server. When both the first object and the second object are object sets, and the first object and the second object are different, it means that some sub-objects of the first object are the intersection objects. In this case, the data information (such as statistical information, predicted data information or the like) corresponding to a union object of the first object and the second object is the target data information which needs to be acquired from the server.

In the step of S400, the target data information is requested from the server.

In this step, since the target data information which needs to be acquired from the server is determined in step S300, the target data information may be requested from the server to complete the data acquisition requests initiated by the initiator of the first request information and the initiator of the second request information.

It should be noted that in the process of requesting the target data information from the server, corresponding data request information may be constructed according to the target data information, and the data request information carries relevant information (such as object identifier and the like) of the object corresponding to the target data information, and then the data request information is sent to the server, to request the server to send the target data information.

In this embodiment, by adopting the data processing method including the above steps S100 to S400, when receiving first request information used to request data information corresponding to a first object and receiving second request information used to request data information corresponding to a second object, it is first determined whether there is an intersection object between the first object and the second object. If there is an intersection object between the first object and the second object, target data information which needs to be acquired from a server is determined according to the intersection object, and the target data information is requested from the server. Since when there is an intersection object between the first object and the second object, target data information which needs to be acquired from the server is first determined according to the intersection object, and then the target data information is requested from the server, it is unnecessary to request data information from the server respectively for the first request information and the second request information. Therefore, the number of times of requesting data information from the server can be reduced, thereby reducing the consumption of resources (such as occupied network bandwidth, CPU resources, etc.) and enabling the resources to be reasonably utilized.

Figure 3:
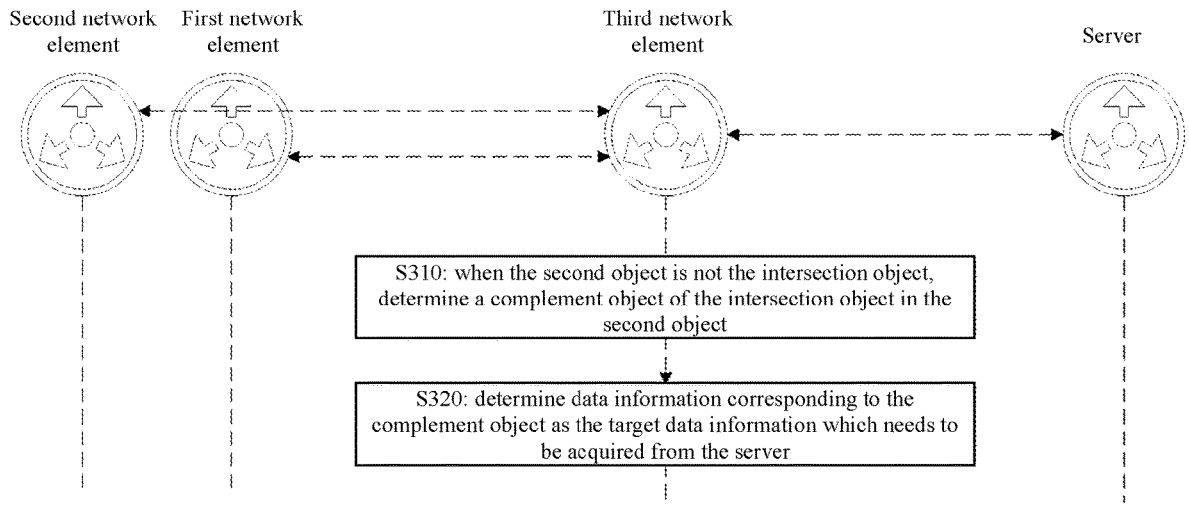
FIG. 3 is a flowchart of a method of step S300 in FIG. 2.

In an embodiment, as shown in FIG. 3, S300 is further illustrated. When the first request information is received prior to the second request information, and data information corresponding to the first object has been requested from the server according to the first request information, S300 may include, but not limited to, the following steps S310 and S320.

In the step of S310, when the second object is not the intersection object, a complement object of the intersection object in the second object is determined.

In this step, when the second object is not the intersection object, it means that the first object is the intersection object, or some sub-objects of the first object and some sub-objects of the second object are the intersection object. Since the first request information is received prior to the second request information, and data information corresponding to the first object has been requested from the server according to the first request information, in order to avoid requesting duplicate data information from the server, a complement object of the intersection object in the second object may be determined first, such that the target data information which needs to be acquired from the server can be determined according to the complement object in a subsequent step. In this way, the purpose of reducing the number of times of requesting data information from the server can be achieved.

It should be noted that a set composed of elements belonging to set A but not belonging to set B is called a complement of set B in set A. Therefore, the rest of the second object except the intersection object is the complement object of the intersection object in the second object.

In the step of S320, data information corresponding to the complement object is determined as the target data information which needs to be acquired from the server.

In this step, since a complement object of the intersection object in the second object is determined in S310, data information corresponding to the complement object can be determined as the target data information which needs to be acquired from the server, such that only the target data information needs to be requested from the server in a subsequent step, and it is unnecessary to request data information from the server respectively for the first request information and the second request information. Thus, the number of times of requesting data information from the server can be reduced, and the purposes of reducing consumption of resources and enabling the resources to be reasonably utilized can be achieved.

Figure 4:
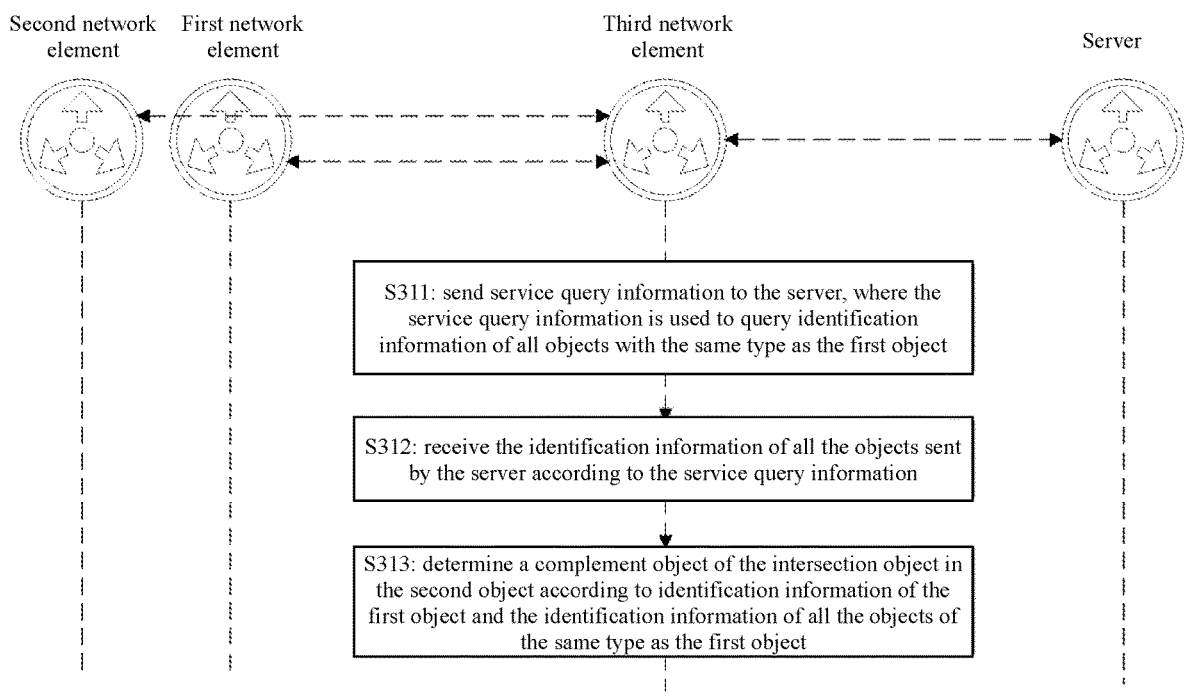
FIG. 4 is a flowchart of a method of step S310 in FIG. 3.

In an embodiment, as shown in FIG. 4, S310 is further illustrated. when the first object is the intersection object and the second object is a set of all objects of the same type as the first object, S310 may include, but not limited to, the following steps S311, S312 and S313.

In the step of S311, service query information is sent to the server, where the service query information is used to query identification information of all objects of the same type as the first object.

In this step, when the first object is the intersection object and the second object is a set of all objects of the same type as the first object, in order to avoid requesting duplicate data information from the server, service query information for querying identification information of all objects of the same type as the first object may be sent to the server first, such that the identification information of all objects of the same type as the first object sent by the server can be received in a subsequent step, and then a complement object of the intersection object in the second object can be determined according to the identification information.

In the step of S312, the identification information of all the objects sent by the server according to the service query information is received.

In this step, since service query information is sent to the server in S311, the identification information of all the objects sent by the server according to the service query information can be received, such that a complement object of the intersection object in the second object can be determined according to the identification information in a subsequent step.

In the step of S313, a complement object of the intersection object in the second object is determined according to identification information of the first object and the identification information of all the objects of the same type as the first object.

In this step, since the first request information is received prior to the second request information, and data information corresponding to the first object has been requested from the server according to the first request information, in order to avoid repeatedly requesting the data information corresponding to the first object from the server, identification information of objects that has not been requested from the server can be determined according to the identification information of the first object and the identification information of all the objects of the same type as the first object sent by the server according to the service query information. In this case, identification information of the objects that has not been requested from the server is the identification information of the complement object of the intersection object in the second object. Therefore, the complement object of the intersection object in the second object can be determined according to the identification information, such that the target data information which needs to be acquired from the server can be determined according to the complement object in a subsequent step, and the purpose of reducing the number of times of requesting data information from the server can be achieved.

Figure 5:
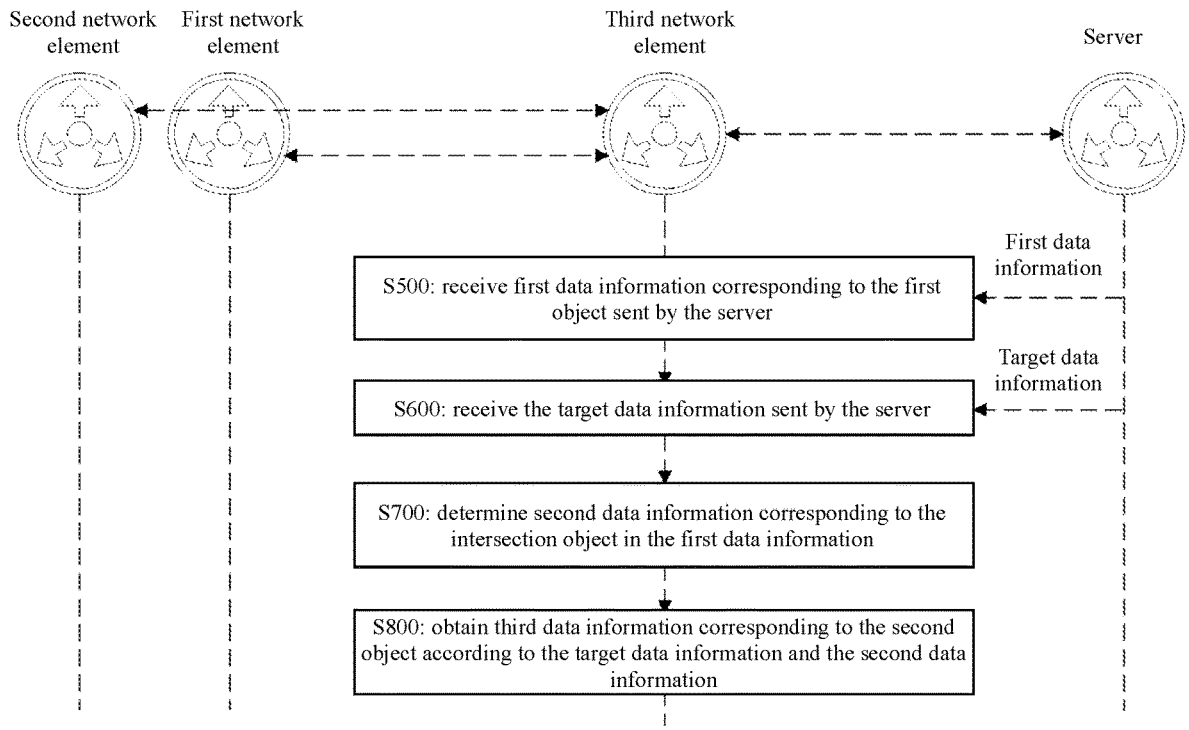
FIG. 5 is a flowchart of a data processing method provided by another embodiment of the present disclosure.

In an embodiment, as shown in FIG. 5, the data processing method may further include, but not limited to, the following steps S500, S600, S700 and S800.

In the step of S500, first data information corresponding to the first object sent by the server is received.

In this step, since data information corresponding to the first object has been requested from the server in advance according to the first request information, first data information corresponding to the first object sent by the server can be received, such that the data information required by the initiator of the first request information can be sent to the initiator according to the first data information in a subsequent step.

It should be noted that after the first request information is received, a new request information may be reconstructed according to the first request information, such that data information corresponding to the first object may be requested from the server using the new request information.

In the step of S600, the target data information sent by the server is received.

In this step, since the target data information is requested from the server in S400, the target data information sent by the server can be received, such that the data information corresponding to the second object can be obtained according to the target data information in a subsequent step.

In the step of S700, second data information corresponding to the intersection object is determined in the first data information.

In this step, since there is an intersection object between the first object and the second object, the received first data information includes data information corresponding to the intersection object. Since the data information corresponding to the intersection object belongs to a part of the data information corresponding to the second object, second data information corresponding to the intersection object may be determined in the first data information first, such that the data information corresponding to the second object can be obtained according to the second data information in a subsequent step.

It should be noted that since the first data information includes data information corresponding to the intersection object, it is only necessary to save one copy of data information corresponding to the intersection object, thus saving storage resources.

In the step of S800, third data information corresponding to the second object is obtained according to the target data information and the second data information.

The target data information sent by the server is received in S600, and the second data information corresponding to the intersection object is determined in S700. The target data information is the data information corresponding to the complement object, and the second data information is the data information corresponding to the intersection object. Therefore, both the target data information and the second data information are a part of the data information corresponding to the second object. Thus, in this step, third data information corresponding to the second object can be obtained according to the target data information and the second data information, such that the data information required by the initiator of the second request information can be sent to the initiator of the second request information according to the third data information in a subsequent step.

Figure 6:
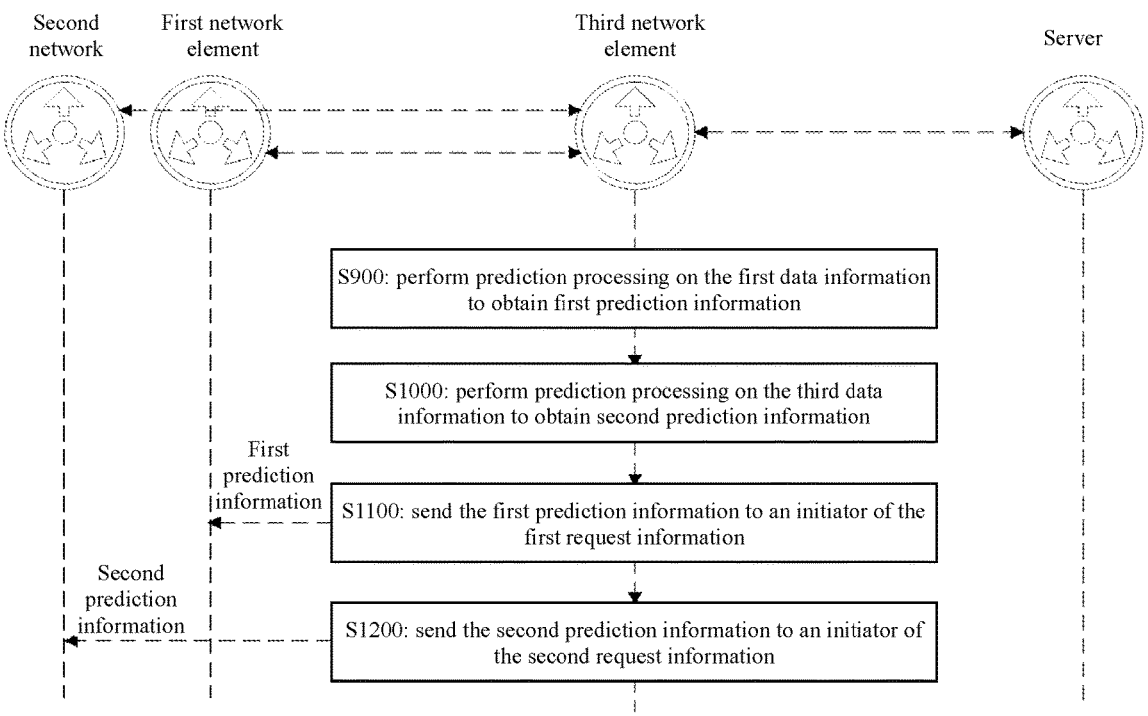
FIG. 6 is a flowchart of a data processing method provided by another embodiment of the present disclosure.

In an embodiment, as shown in FIG. 6, the data processing method is further illustrated. When both the first request information and the second request information request data prediction analytics, the data processing method may further include, but not limited to, the following steps.

In a step of S900, prediction processing is performed on the first data information to obtain first prediction information.

In a step of S1000, prediction processing is performed on the third data information to obtain second prediction information.

In a step of S1100, the first prediction information is sent to the initiator of the first request information.

In a step of S1200, the second prediction information is sent to the initiator of the second request information.

In this embodiment, since the first data information is received in S500 and the third data information is obtained in S800, when both the first request information and the second request information request data prediction analytics, prediction processing can be performed on the first data information to obtain first prediction information, and on the third data information to obtain second prediction information. Then the first prediction information is sent to the initiator of the first request information, and the second prediction information is sent to the initiator of the second request information, thus completing data request processing for the first request information and the second request information.

It should be noted that after the first data information and the third data information are obtained, prediction processing may be performed on the first data information and the third data information respectively using an AI algorithm model, to obtain first prediction information corresponding to the first data information and second prediction information corresponding to the third data information. It should be noted that the AI algorithm model is a conventional algorithm model known in this field, and AI algorithm models with different functions may be selected according to different application scenarios, which will not be specifically limited in this embodiment.

In addition, in an embodiment, S300 is further illustrated. When the first request information is received prior to the second request information, and data information corresponding to the first object has been requested from the server according to the first request information, S300 may further include, but not limited to, a following step of:

determining that the target data information which needs to be acquired from the server is null when the second object is the intersection object.

It should be noted that the step in this embodiment, and the steps S310 to S320 in the embodiment shown in FIG. 3 belong to juxtaposed technical schemes.

In this embodiment, when the second object is the intersection object, it means that the data information requested by the first request information includes the data information requested by the second request information. Since data information corresponding to the first object has been requested from the server in advance according to the first request information, it can be determined that the target data information which needs to be acquired from the server is null, that is, it is unnecessary to request new data information from the server. Thus, the number of times of requesting data information from the server can be reduced, and the purposes of reducing consumption of resources and enabling the resources to be reasonably utilized can be achieved.

Figure 7:
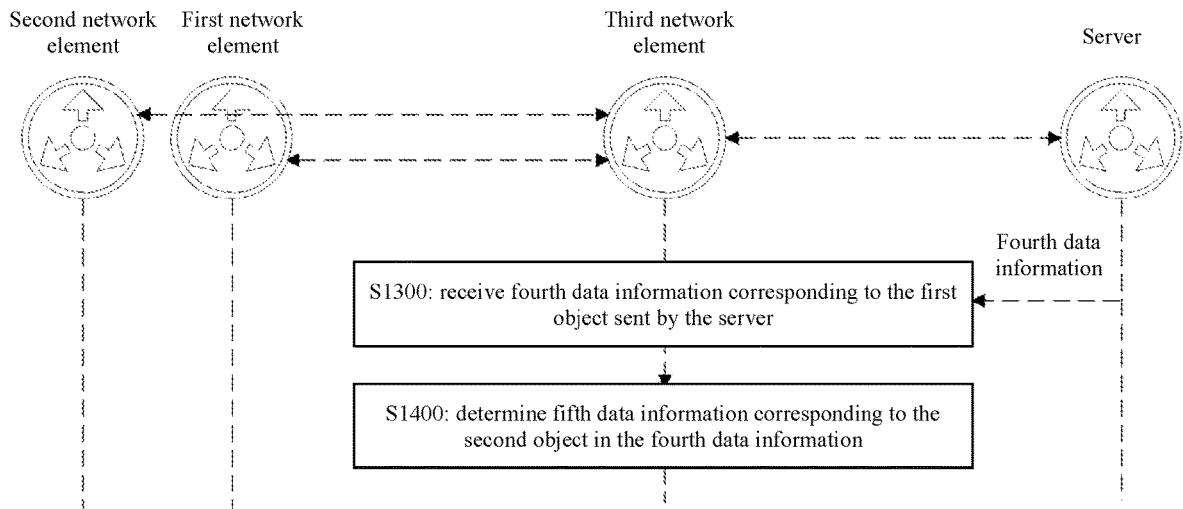
FIG. 7 is a flowchart of a data processing method provided by another embodiment of the present disclosure.

In an embodiment, as shown in FIG. 7, when the second object is the intersection object, the data processing method may further include, but not limited to, the following steps S1300 and S1400.

In the step of S1300, fourth data information corresponding to the first object sent by the server is received.

In this step, since data information corresponding to the first object has been requested from the server in advance according to the first request information, fourth data information corresponding to the first object sent by the server can be received, such that the data information required by the initiator of the first request information can be sent to the initiator according to the fourth data information in a subsequent step.

In the step of S1400, fifth data information corresponding to the second object is determined in the fourth data information.

In this step, since the second object is the intersection object, the data information requested by the first request information includes the data information requested by the second request information, so that the fourth data information received in S1300 includes the data information corresponding to the second object. Therefore, fifth data information corresponding to the second object can be determined in the fourth data information, such that the data information required by the initiator of the second request information can be sent to the initiator according to the fifth data information in a subsequent step.

It should be noted that since the fourth data information includes the data information corresponding to the second object, it is only necessary to save one copy of the data information corresponding to the first object, thus saving storage resources.

In addition, in an embodiment, S1400 is further illustrated. When the first object is the same as the second object, and the first request information requests to acquire data information corresponding to the first object at a first time interval and the second request information requests to acquire data information corresponding to the second object at a second time interval, S1400 may include, but not limited to, a following step of:

collecting fifth data information corresponding to the second object in the fourth data information with a ratio of the first time interval to the second time interval as a sampling ratio.

It should be noted that the first time interval and the second time interval are different. Since the fourth data information acquired from the server includes the data information corresponding to the second object, it is unnecessary to additionally request data information corresponding to the second object from the server. In addition, since the first request information requests to acquire data information corresponding to the first object at a first time interval and the second request information requests to acquire data information corresponding to the second object at a second time interval, fifth data information corresponding to the second object may be collected in the fourth data information with a ratio of the first time interval to the second time interval as a sampling ratio. Therefore, the number of times of requesting data information from the server can be reduced, and the purposes of reducing consumption of resources and enabling the resources to be reasonably utilized can be achieved.

Figure 8:
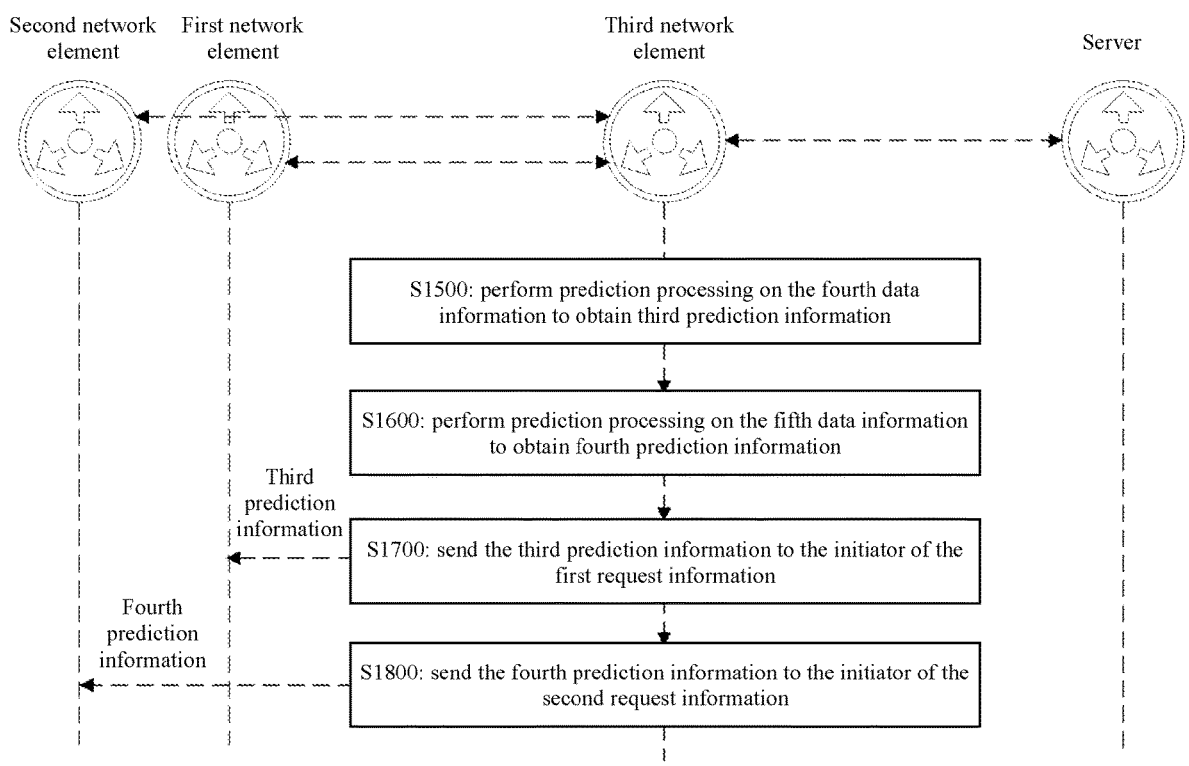
FIG. 8 is a flowchart of a data processing method provided by another embodiment of the present disclosure.

In an embodiment, as shown in FIG. 8, the data processing method is further illustrated. When both the first request information and the second request information request data prediction analytics, the data processing method may further include, but not limited to, the following steps.

In a step of S1500, prediction processing is performed on the fourth data information to obtain third prediction information.

In a step of S1600, prediction processing is performed on the fifth data information to obtain fourth prediction information.

In a step of S1700, the third prediction information is sent to the initiator of the first request information.

In a step of S1800, the fourth prediction information is sent to the initiator of the second request information.

In this embodiment, since fourth data information is received in S1300 and fifth data information is obtained in S1400, when both the first request information and the second request information request data prediction analytics, prediction processing is performed on the fourth data information to obtain third prediction information, and on the fifth data information to obtain fourth prediction information. Then, the third prediction information is sent to the initiator of the first request information, and the fourth prediction information is sent to the initiator of the second request information, thus completing data request processing for the first request information and the second request information.

It should be noted that after the fourth data information and the fifth data information are obtained, prediction processing may be performed on the fourth data information and the fifth data information respectively using an AI algorithm model, to obtain third prediction information corresponding to the fourth data information and fourth prediction information corresponding to the fifth data information. It should be noted that the AI algorithm model is a conventional algorithm model known in this field, and AI algorithm models with different functions may be selected according to different application scenarios, which will not be specifically limited in this embodiment.

In addition, in an embodiment, S300 is further illustrated. When the first request information and the second request information are received simultaneously, S300 may further include, but not limited to, a following step of:

determining the data information corresponding to the first object as the target data information which needs to be acquired from the server when the second object is the intersection object.

It should be noted that the step in this embodiment, and the steps S310 to S320 in the embodiment shown in FIG. 3 belong to juxtaposed technical schemes.

In this embodiment, when the first request information and the second request information are received simultaneously, and when the second object is the intersection object, it means that the data information corresponding to the first object which needs to be requested from the server includes the data information corresponding to the second object which needs to be requested from the server. In this case, in order to avoid requesting duplicate data information from the server, the data information corresponding to the first object may be determined as the target data information which needs to be acquired from the server. That is, it is only necessary to request data information corresponding to the first object from the serve in a subsequent step, and it is unnecessary to additionally request data information corresponding to the second object from the server, such that the number of times of requesting data information from the server can be reduced, and the purposes of reducing consumption of resources and enabling the resources to be reasonably utilized may be achieved.

Figure 9:
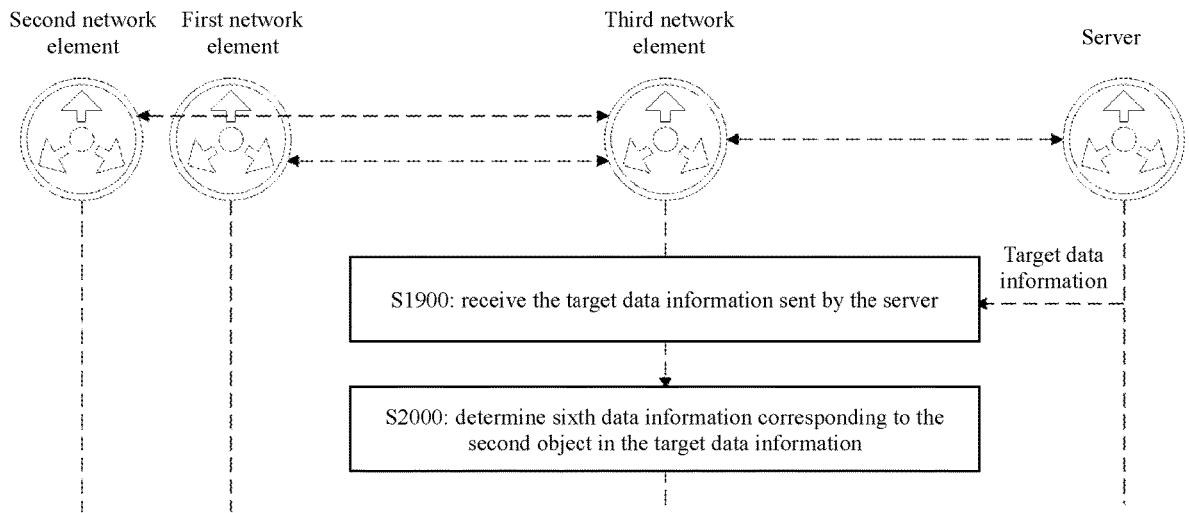
FIG. 9 is a flowchart of a data processing method provided by another embodiment of the present disclosure.

In an embodiment, as shown in FIG. 9, when the first request information and the second request information are received simultaneously, and the second object is not the intersection object, the data processing method may further include, but not limited to, steps S1900 and S2000.

In the step of S1900, the target data information sent by the server is received.

In this step, since the target data information is requested from the server in S400, the target data information sent by the server can be received, such that data information corresponding to the first object and data information corresponding to the second object can be obtained according to the target data information in a subsequent step.

It should be noted that since the data information corresponding to the first object is determined as the target data information which needs to be acquired from the server prior to S400 is performed, the target data information received in this step is the data information corresponding to the first object.

In the step of S2000, sixth data information corresponding to the second object is determined in the target data information.

In this step, since the second object is the intersection object, the data information requested by the first request information includes the data information requested by the second request information, so that the target data information received in S1900 includes the data information corresponding to the second object. Therefore, the sixth data information corresponding to the second object can be determined in the target data information, such that the data information required by the initiator of the second request information can be sent to the initiator according to the sixth data information in a subsequent step.

It should be noted that since the target data information includes the data information corresponding to the second object, it is only necessary to save one copy of the data information corresponding to the first object, thus saving storage resources.

In addition, in an embodiment, S2000 is further illustrated. When the first object is the same as the second object, and the first request information requests to acquire data information corresponding to the first object at a third time interval and the second request information requests to acquire data information corresponding to the second object at a fourth time interval, S2000 may include, but not limited to, a following step of:

collecting the sixth data information corresponding to the second object collected in the target data information with a ratio of the third time interval to the fourth time interval as a sampling ratio.

It should be noted that the third time interval and the fourth time interval are different. Since the target data information acquired from the server includes the data information corresponding to the second object, it is unnecessary to additionally request data information corresponding to the second object from the server. In addition, since the first request information requests to acquire data information corresponding to the first object at the third time interval and the second request information requests to acquire data information corresponding to the second object at the fourth time interval, sixth data information corresponding to the second object can be collected in the target data information with a ratio of the third time interval to the fourth time interval as a sampling ratio. Therefore, the number of times of requesting data information from the server can be reduced, and then the purposes of reducing consumption of resources and enabling the resources to be reasonably utilized can be achieved.

Figure 10:
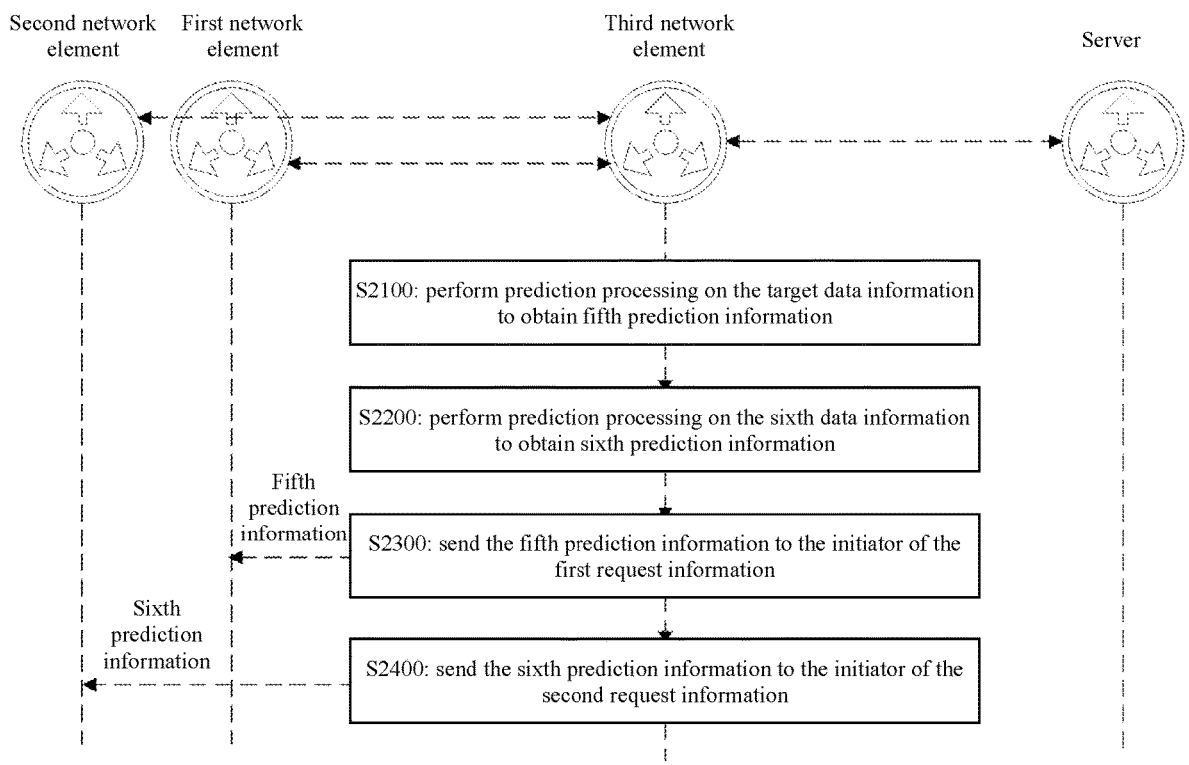
FIG. 10 is a flowchart of a data processing method provided by another embodiment of the present disclosure.

In an embodiment, as shown in FIG. 10, the data processing method is further illustrated. When both the first request information and the second request information request data prediction analytics, the data processing method may further include, but not limited to, the following steps.

In a step of S2100, prediction processing is performed on the target data information to obtain fifth prediction information.

In a step of S2200, prediction processing is performed on the sixth data information to obtain sixth prediction information.

In a step of S2300, the fifth prediction information is sent to the initiator of the first request information.

In a step of S2400, the sixth prediction information is sent to the initiator of the second request information.

In this embodiment, since the target data information is received in S1900 and the sixth data information is obtained in S2000, when both the first request information and the second request information request data prediction analytics, prediction processing is performed on the target data information to obtain fifth prediction information, and prediction processing is performed on the sixth data information to obtain sixth prediction information. Then, the fifth prediction information is sent to the initiator of the first request information, and the sixth prediction information is sent to the initiator of the second request information, thus completing data request processing for the first request information and the second request information.

It should be noted that after the target data information and the sixth data information are obtained, prediction processing can be performed on the target data information and the sixth data information respectively using an AI algorithm model, to obtain fifth prediction information corresponding to the target data information and sixth prediction information corresponding to the sixth data information. It should be noted that the AI algorithm model is a conventional algorithm model known in this field, and AI algorithm models with different functions may be selected according to different application scenarios, which will not be specifically limited in this embodiment.

Figure 11:
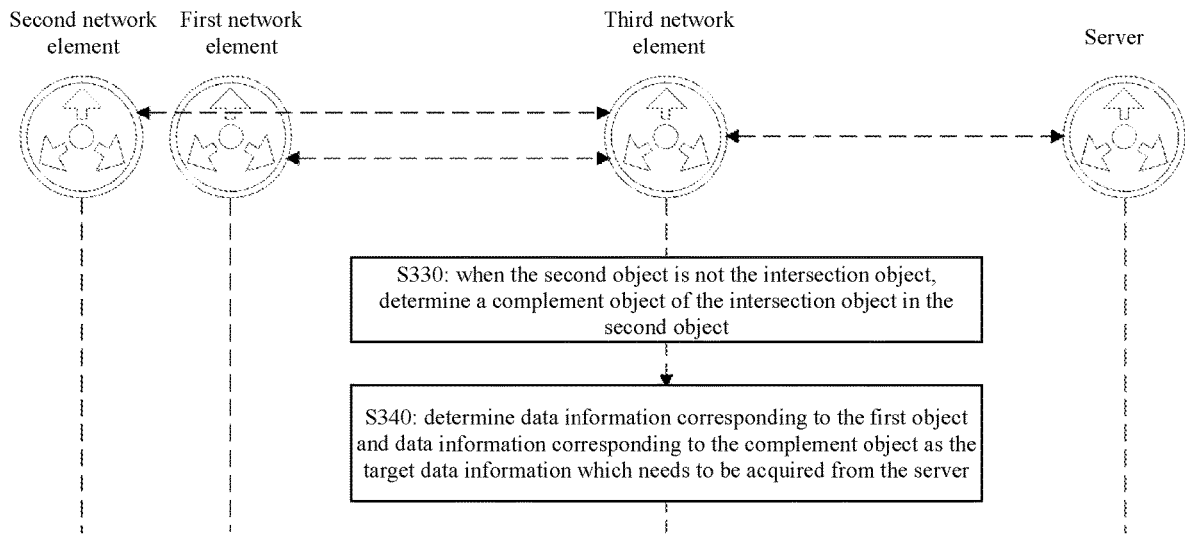
FIG. 11 is a flowchart of another method of step S300 in FIG. 2.

In an embodiment, as shown in FIG. 11, S300 is further illustrated. When the first request information and the second request information are received simultaneously, S300 may include, but not limited to, the following steps.

In a step of S330, when the second object is not the intersection object, a complement object of the intersection object in the second object is determined.

In a step of S340, data information corresponding to the first object and data information corresponding to the complement object are determined as the target data information which needs to be acquired from the server.

It should be noted that the steps S330 to S340 in this embodiment, and the steps S310 to S320 in the embodiment shown in FIG. 3 belong to juxtaposed technical schemes.

In this embodiment, when the second object is not the intersection object, it means that the first object is the intersection object, or some sub-objects of the first object and some sub-objects of the second object are the intersection object. Since the first request information and the second request information are received simultaneously, it means that the data information corresponding to the first object which needs to be requested from the server and the data information corresponding to the second object which needs to be requested from the server have duplicate contents. In order to avoid requesting duplicate data information from the server, a complement object of the intersection object in the second object can be determined first, and then the data information corresponding to the first object and the data information corresponding to the complement object can be determined as the target data information which needs to be acquired from the server. Therefore, in a subsequent step, new request information may be reconstructed according to the target data information, and then the target data information is acquired through the new request information, such that the purpose of reducing the number of times of requesting data information from the server is achieved.

Figure 12:
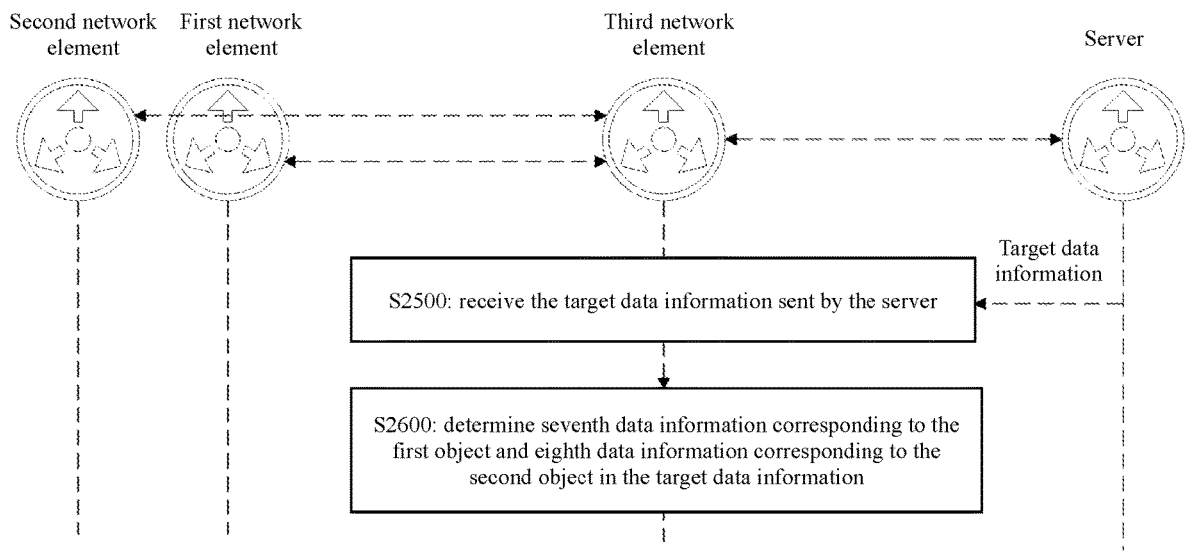
FIG. 12 is a flowchart of a data processing method provided by another embodiment of the present disclosure.

In an embodiment, as shown in FIG. 12, when the first request information and the second request information are received simultaneously, and the second object is not the intersection object, the data processing method may further include, but not limited to, steps S2500 and S2600.

In the step of S2500, the target data information sent by the server is received.

In this step, since the target data information is requested from the server in S400, the target data information sent by the server can be received, such that data information corresponding to the first object and data information corresponding to the second object can be obtained according to the target data information in a subsequent step.

It should be noted that since the data information corresponding to the first object and the data information corresponding to the complement object are determined as the target data information which needs to be acquired from the server prior to S400 is performed, the target data information received in this step includes the data information corresponding to the first object and the data information corresponding to the complement object.

In the step of S2600, seventh data information corresponding to the first object and eighth data information corresponding to the second object are determined in the target data information.

In this step, since the target data information received in S2500 includes data information corresponding to the first object and data information corresponding to the complement object, seventh data information corresponding to the first object and eighth data information corresponding to the second object can be determined in the target data information, such that the data information required by the initiator of the first request information can be sent to the initiator of the first request information according to the seventh data information and the data information required by the initiator of the second request information can be sent to the initiator of the second request information according to the eighth data information in a subsequent step.

It should be noted that since the received target data information includes the seventh data information corresponding to the first object and the data information corresponding to the complement object, data information corresponding to the intersection object can be determined in the seventh data information first, and then eighth data information corresponding to the second object can be obtained according to the data information corresponding to the intersection object and the data information corresponding to the complement object.

It should be noted that since the target data information includes data information corresponding to the intersection object, it is only necessary to save one copy of data information corresponding to the intersection object, thus saving storage resources.

Figure 13:
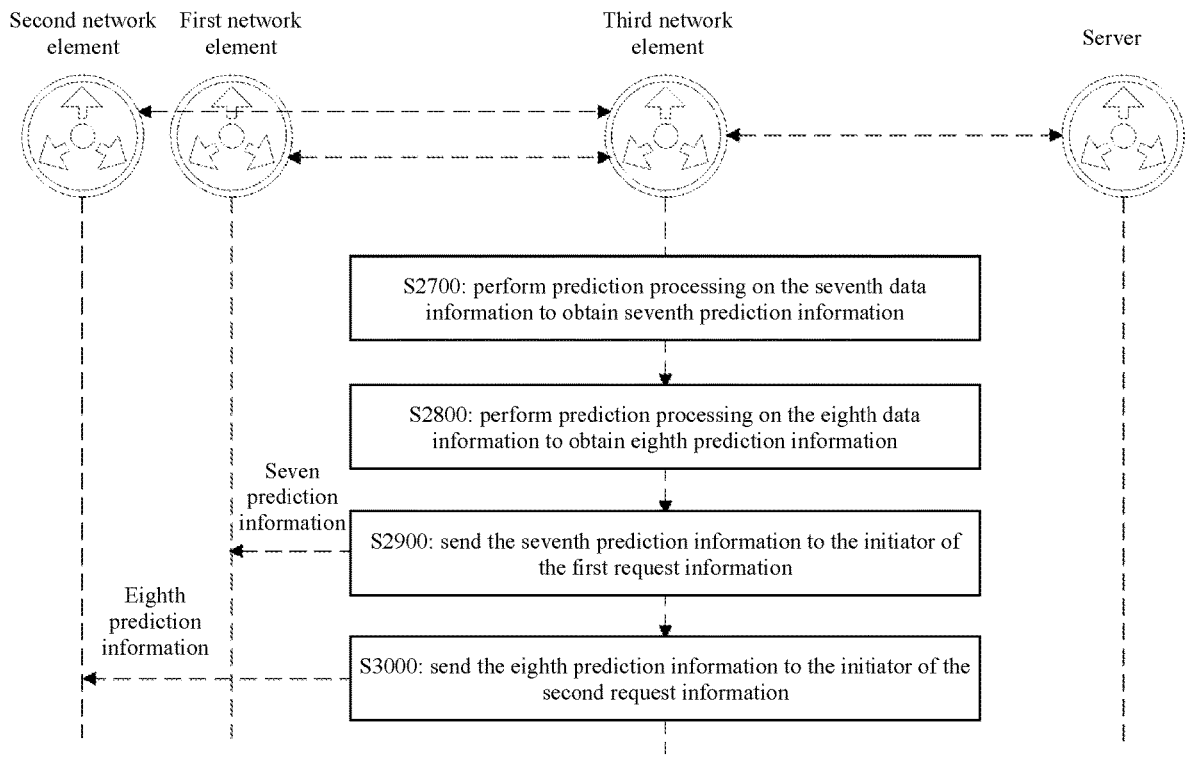
FIG. 13 is a flowchart of a data processing method provided by another embodiment of the present disclosure.

In an embodiment, as shown in FIG. 13, the data processing method is further illustrated. When both the first request information and the second request information request data prediction analytics, the data processing method may further include, but not limited to, the following steps.

In a step of S2700, prediction processing is performed on the seventh data information to obtain seventh prediction information.

In a step of S2800, prediction processing is performed on the eighth data information to obtain eighth prediction information.

In a step of S2900, the seventh prediction information is sent to the initiator of the first request information.

In a step of S3000, the eighth prediction information is sent to the initiator of the second request information.

In this embodiment, since the seventh data information and the eighth data information are obtained in S2600, when both the first request information and the second request information request data prediction analytics, prediction processing is performed on the seventh data information to obtain seventh prediction information, and on the eighth data information to obtain eighth prediction information. Then, the seventh prediction information is sent to the initiator of the first request information, and the eighth prediction information is sent to the initiator of the second request information, thus completing data request processing for the first request information and the second request information.

It should be noted that after the seventh data information and the eighth data information are obtained, prediction processing may be performed on the seventh data information and the eighth data information using an AI algorithm model, to obtain seventh prediction information corresponding to the seventh data information and eighth prediction information corresponding to the eighth data information. It should be noted that the AI algorithm model is a conventional algorithm model known in this field, and AI algorithm models with different functions may be selected according to different application scenarios, which will not be specifically limited in this embodiment.

In order to more clearly illustrate the processing flow of the data processing method provided by the embodiment of the present disclosure, the processing flow is described below with specific examples.

Example One

Figure 14:
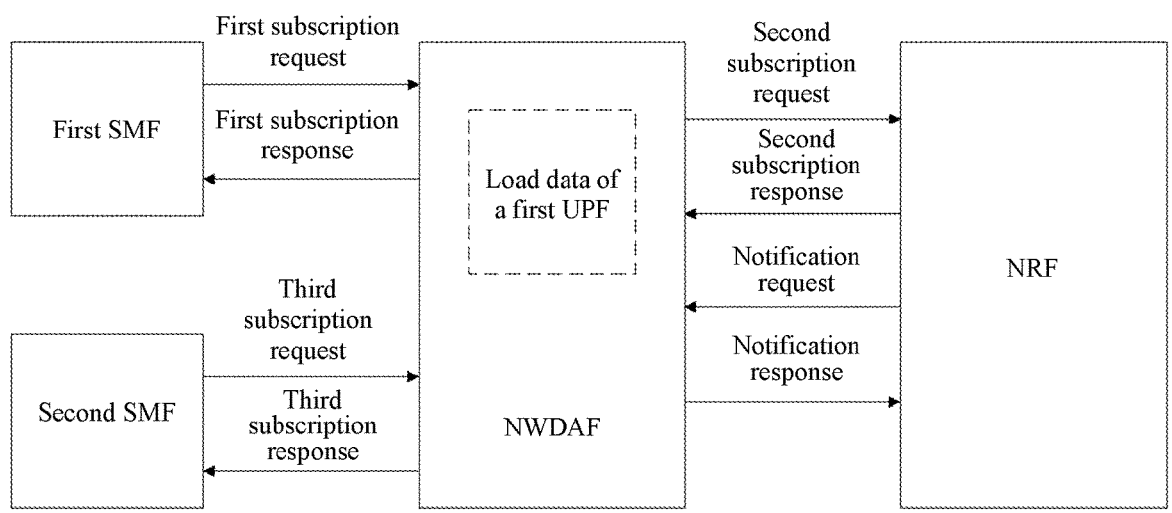
FIG. 14 is a schematic diagram of a system architecture for performing a data processing method provided by an example of the present disclosure.

As shown in FIG. 14, FIG. 14 is a schematic diagram of a system architecture for performing a data processing method provided by an example of the present disclosure. The system architecture shown in FIG. 14 includes a first SMF, a second SMF, an NWDAF and an NRF. In this example, the first SMF sends a first subscription request to the NWDAF to subscribe to a load prediction result of a first UPF. At this time, the NWDAF sends a second subscription request to the NRF to subscribe to a load change notification of the first UPF. After the NRF receives the second subscription request, when load data of the first UPF changes, the NRF sends a notification request carrying the load data of the first UPF to the NWDAF. At this time, the NWDAF samples the load data of the first UPF once every period according to a repetition period parameter carried in the first subscription request, and saves these load data as training sample data of the AI algorithm model. At this time, the second SMF sends a third subscription request to the NWDAF to subscribe to the load prediction result of the first UPF, and the NWDAF will merge data information requested by the first subscription request and data information requested by the third subscription request, and will no longer initiate a new subscription request to the NRF repeatedly.

It should be noted that after the NRF receives the second subscription request sent by the NWDAF, if the NRF does not send the notification request, the NWDAF may use load data saved by the NWDAF as the training sample data of the AI algorithm model, but the value of the load data is 0.

Example Two

Referring to the example as shown in FIG. 14, the first SMF sends a first subscription request to the NWDAF to subscribe to a load prediction result of a first UPF, and the repetition period is one minute. In this case, the NWDAF sends a second subscription request to the NRF to subscribe to a load change notification of the first UPF. At this time, the second SMF sends a third subscription request to the NWDAF to subscribe to the load prediction result of the first UPF, and the repetition period is two minutes. In this case, the NWDAF will no longer send a new subscription request to the NRF, but will sample the acquired load data of the first UPF at a sampling ratio of 1/2, and the sampled data obtained is the load data corresponding to the third subscription request.

Example Three

Figure 15:
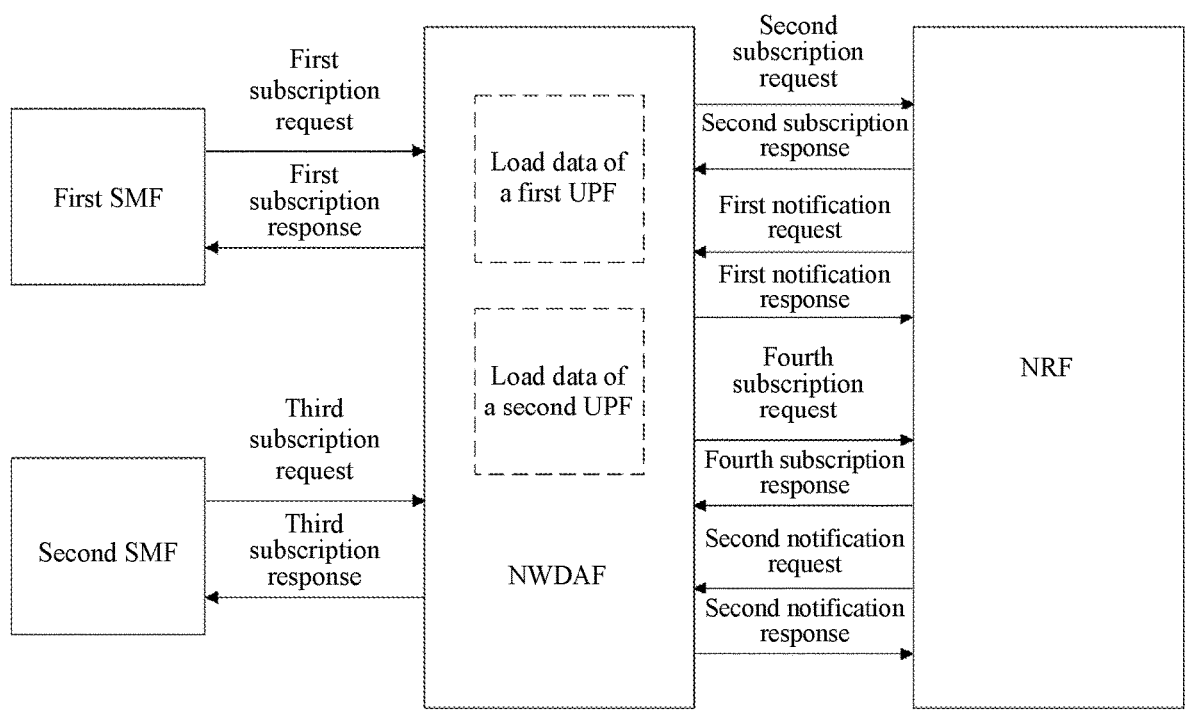
FIG. 15 is a schematic diagram of a system architecture for performing a data processing method provided by another example of the present disclosure.

As shown in FIG. 15, FIG. 15 is a schematic diagram of a system architecture for performing a data processing method provided by another example of the present disclosure. The system architecture shown in FIG. 15 includes a first SMF, a second SMF, an NWDAF and an NRF. In this example, the first SMF sends a first subscription request to the NWDAF to subscribe to a load prediction result of a first UPF. In this case, the NWDAF sends a second subscription request to the NRF to subscribe to a load change notification of the first UPF. After the NRF receives the second subscription request, when load data of the first UPF changes, the NRF sends a notification request carrying the load data of the first UPF to the NWDAF. At this time, the NWDAF samples the load data of the first UPF once every period according to a repetition period parameter carried in the first subscription request, and saves the load data as training sample data of the AI algorithm model. At this time, the second SMF sends a third subscription request to the NWDAF to subscribe to the load prediction result of the first UPF and a load prediction result of a second UPF, and the NWDAF will merge the information related to the load prediction result of the first UPF in the first subscription request and the third subscription request. In other words, the NWDAF will only send a fourth subscription request to the NRF to subscribe to a load change notification of the second UPF, and will no longer initiate a subscription request for the load change notification of the first UPF to the NRF repeatedly.

It should be noted that since the second subscription request sent by the NWDAF to the NRF is only used to subscribe to the load change notification of the first UPF, and the fourth subscription request sent by the NWDAF to the NRF is only used to subscribe to the load change notification of the second UPF, only one copy of the load data of the first UPF and one copy of the load data of the second UPF are saved in the NWDAF, thus saving storage resources of the NWDAF.

Example Four

Figure 16:
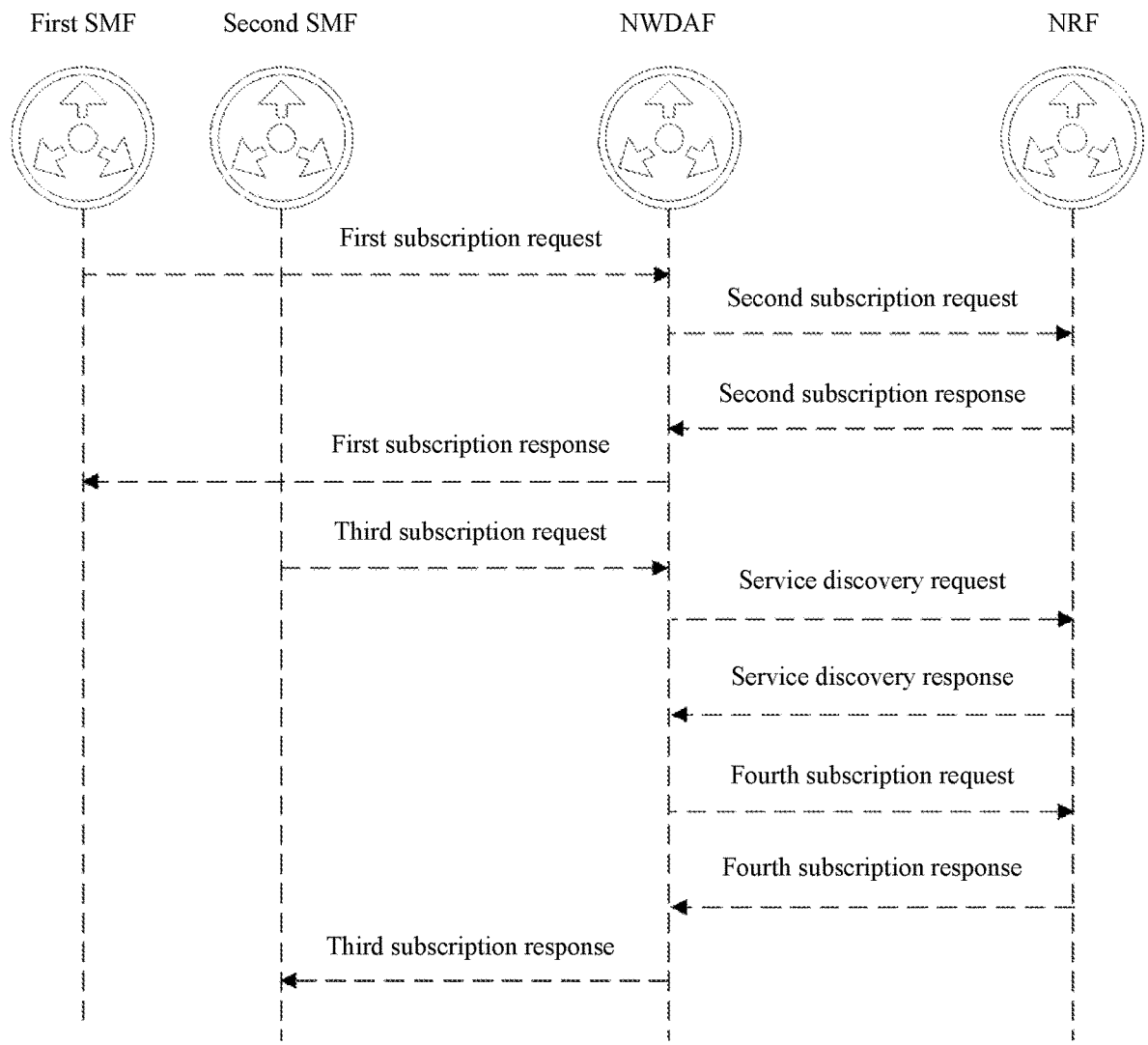
FIG. 16 is a flowchart of a data processing method provided by another example of the present disclosure.

As shown in FIG. 16, FIG. 16 is a flowchart of a data processing method provided by another example of the present disclosure. In this example, the first SMF sends a first subscription request to the NWDAF to subscribe to a load prediction result of a first UPF. In this case, the NWDAF sends a second subscription request to the NRF to subscribe to a load change notification of the first UPF. At this time, the second SMF sends a third subscription request to the NWDAF to subscribe to load prediction results of all UPFs, and the NWDAF will first send a service discovery request to the NRF and carries information with an NF type of UPF in a discovery condition information field of the service discovery request. After the NRF receives the service discovery request, the NRF sends a service discovery response to the NWDAF, and carries all UPF information that meets discovery conditions in the service discovery response. After receiving the service discovery response, the NWDAF determines a specific UPF that does not exist in the NWDAF according to the first UPF and all the UPFs, and then send a fourth subscription request to the NRF to subscribe to load change notifications of other UPFs except the first UPF.

Example Five

Figure 17:
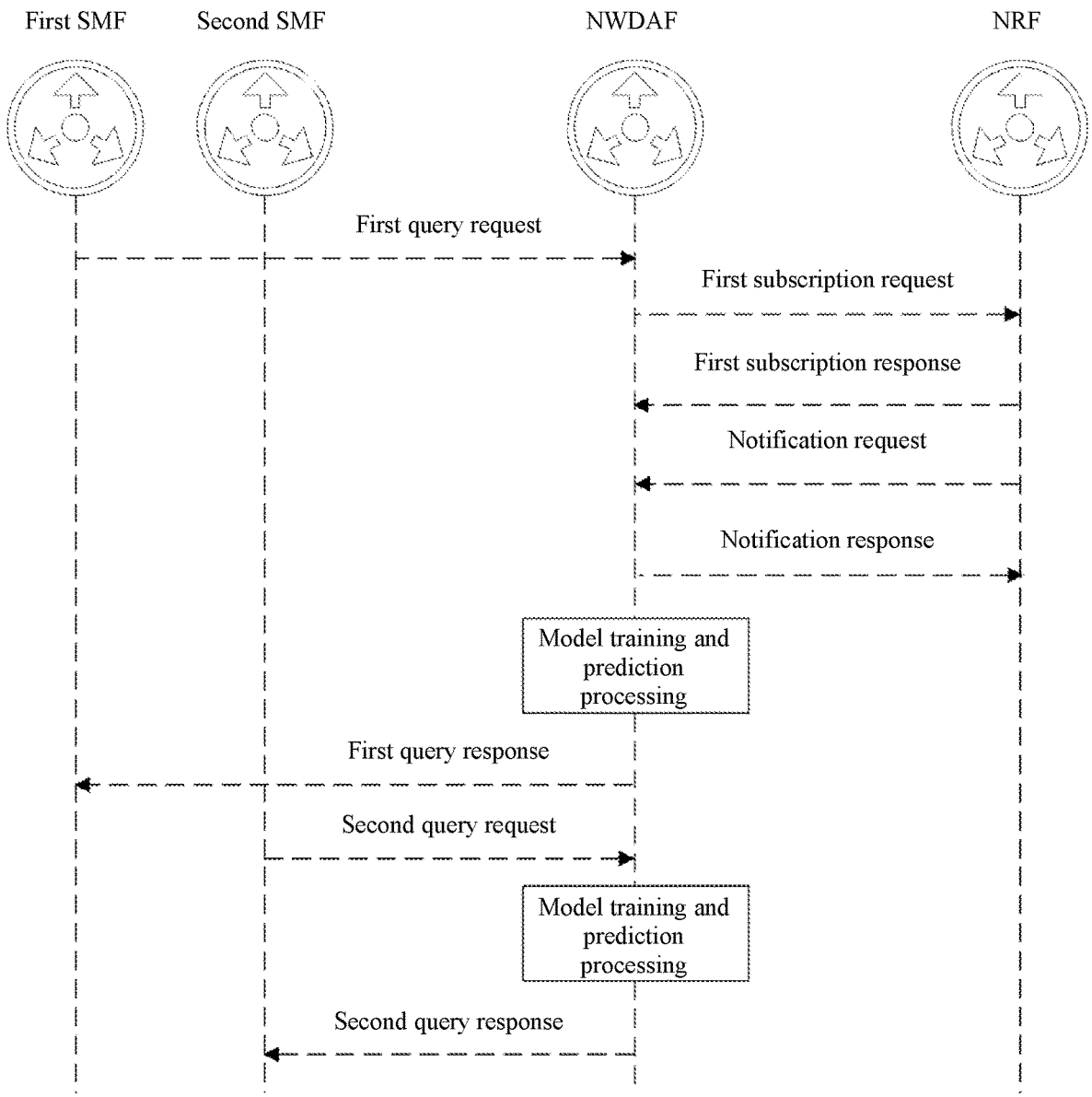
FIG. 17 is a flowchart of a data processing method provided by another example of the present disclosure.

As shown in FIG. 17, FIG. 17 is a flowchart of a data processing method provided by another example of the present disclosure. In this example, the first SMF sends a first query request to the NWDAF to query a load prediction result of a first UPF in a certain period of time in the future. If there is enough load data of the first UPF in the NWDAF, the NWDAF may immediately start relevant model training and prediction processing according to these load data; and if there is not enough load data of the first UPF in the NWDAF, the NWDAF may send a first subscription request to the NRF to subscribe to a load change notification of the first UPF, and the NRF may send a notification request to the NWDAF when the load data of the first UPF changes and send new load data of the first UPF to the NWDAF. After the NWDAF completes load prediction according to the load data of the first UPF and obtains a prediction result, the NWDAF sends a first query response to the first SMF, and carries the prediction result in the first query response. At this time, the second SMF sends a second query request to the NWDAF to query a load prediction result of the first UPF in another period of time of time in the future, and the NWDAF will merge the first query request and the second query request. In other words, the NWDAF does not repeatedly initiate a new subscription request to the NRF, but performs model training and prediction processing corresponding to the second query request using the load data of the first UPF stored in the NWDAF, and sends the prediction result to the second SMF after obtaining the prediction result.

Example Six

Figure 18:
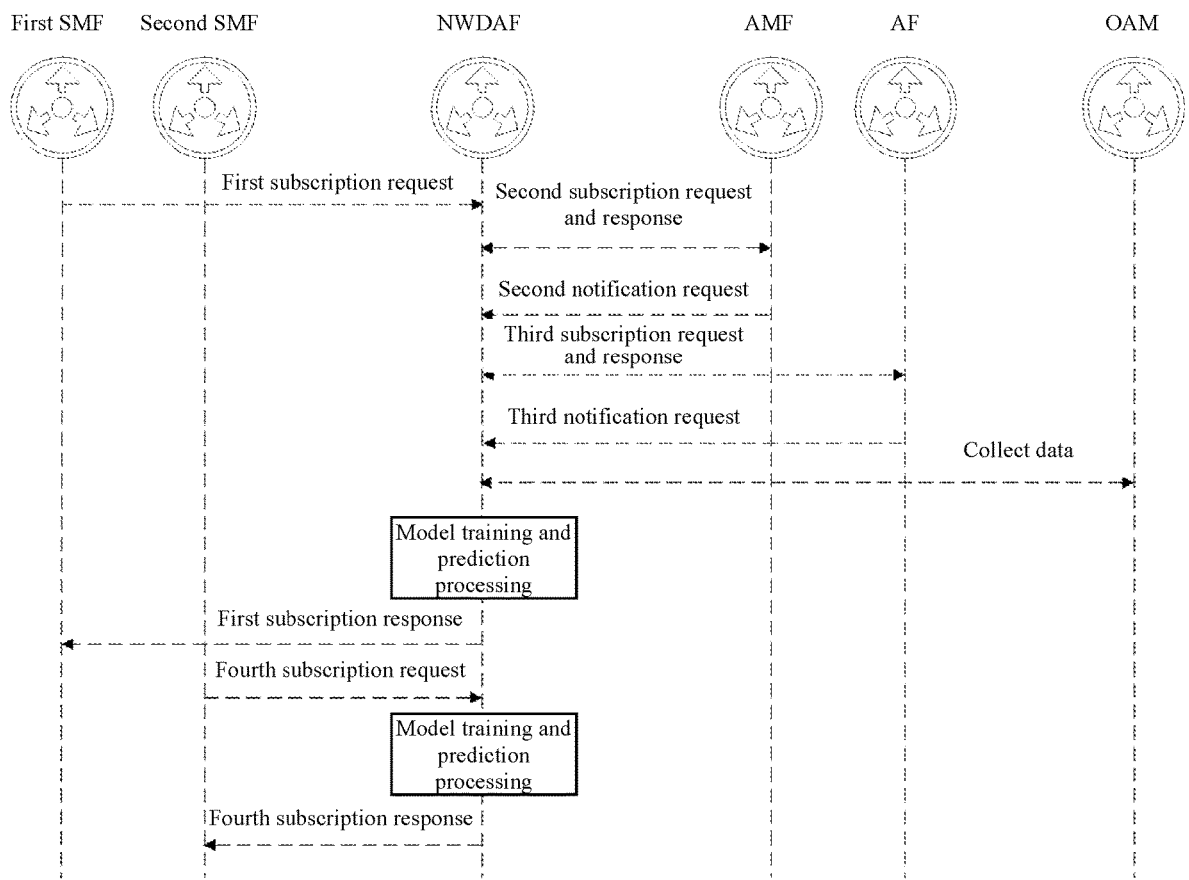
FIG. 18 is a flowchart of a data processing method provided by another example of the present disclosure.

As shown in FIG. 18, FIG. 18 is a flowchart of a data processing method provided by another example of the present disclosure. In this example, the first NF sends a first subscription request to the NWDAF, to request mobility prediction of a certain UE in a certain period of time in the future. Since mobility data is mainly related to the AMF and the OAM, the NWDAF may first send a second subscription request to the AMF to subscribe to mobility data of the UE, and the AMF may reply a corresponding second subscription response to the NWDAF and send a second notification request to the NWDAF. According to the actual situation, the NWDAF may also send a third subscription request to an AF to subscribe to relevant service data, and collect relevant data from the OAM. After completing mobility prediction for the UE, the NWDAF may carry a corresponding prediction result in the first notification request. At this time, the second NF sends a fourth subscription request to the NWDAF, to request mobility prediction of the UE in another period of time in the future. At this time, the NWDAF merges the first subscription request and the fourth subscription request without initiating a new subscription request to the AMF, OAM or AF, performs model training and prediction processing corresponding to the fourth subscription request using the mobility data of the UE stored in the NWDAF, and sends a prediction result to the second NF after obtaining the prediction result.

In addition, another embodiment of the present disclosure provides a network element including: a memory, a processor and a computer program stored in the memory and runnable on the processor.

The processor and the memory may be connected by a bus or in other ways.

As a non-transient computer-readable storage medium, the memory may be configured to store non-transient software programs and non-transient computer-executable programs. In addition, the memory may include a high-speed random access memory, and may also include a non-transient memory, such as at least one magnetic disk storage device, a flash memory device, or other non-transient solid state storage device. In some implementations, the memory may include memories remotely located with respect to the processor, and these remote memories may be connected to the processor through networks. Examples of the above networks include, but not limited to, the Internet, an intranet, a local area network, a mobile communication network, and combinations thereof.

It should be noted that the network element in this embodiment may be used as the network element 130 in the embodiment shown in FIG. 1, and the network element in this embodiment can form, for example, a part of the system architecture in the embodiment shown in FIG. 1. These embodiments all belong to the same inventive concept, and therefore have the same implementation principles and technical effects, which will not be described in detail here.

Non-transient software programs and instructions required to implement the data processing method in the above embodiment are stored in the memory, which, when executed by the processor, cause the processor to implement the data processing method in the above embodiment, for example, implement the above-described method steps S100 to S400 in FIG. 2, steps S310 to S320 in FIG. 3, steps S311 to S313 in FIG. 4, steps S500 to S800 in FIG. 5, steps S900 to S1200 in FIG. 6, steps S1300 to S1400 in FIG. 7, steps S1500 to S1800 in FIG. 8, steps S1900 to S2000 in FIG. 9, steps S2100 to S2400 in FIG. 10, steps S330 to S340 in FIG. 11, steps S2500 to S2600 in FIG. 12, or steps S2700 to S3000 in FIG. 13.

The network element embodiments described above are merely illustrative, and the units described as separate components may or may not be physically separated, that is, may be located in one place, or may be distributed onto multiple network elements. Some or all of the modules may be selected according to actual needs to achieve the purpose of this embodiment.

In addition, an embodiment of the present disclosure provides a computer-readable storage medium, storing a computer-executable instruction which, when executed by a processor or controller, for example, by a processor in the above-mentioned network element embodiment, may cause the above-mentioned processor to implement the data processing method in the above-mentioned embodiment, for example, implement the above-described method steps S100 to S400 in FIG. 2, steps S310 to S320 in FIG. 3, steps S311 to S313 in FIG. 4, steps S500 to S800 in FIG. 5, steps S900 to S1200 in FIG. 6, steps S1300 to S1400 in FIG. 7, steps S1500 to S1800 in FIG. 8, steps S1900 to S2000 in FIG. 9, steps S2100 to S2400 in FIG. 10, steps S330 to S340 in FIG. 11, steps S2500 to S2600 in FIG. 12, or steps S2700 to S3000 in FIG. 13.

An embodiment of the present disclosure includes: receiving first request information, where the first request information is used to request data information corresponding to a first object; receiving second request information, where the second request information is used to request data information corresponding to a second object; when there is an intersection object between the first object and the second object, determining target data information which needs to be acquired from a server according to the intersection object; and requesting the target data information from the server. According to the scheme of the embodiment of the present disclosure, since when there is an intersection object between the first object and the second object, target data information which needs to be acquired from a server is determined according to the intersection object, and then the target data information is requested from the server, such that it is unnecessary to request data information from the server for the first request information and the second request information, respectively. Therefore, the number of times of requesting data information from the server can be reduced, thereby reducing the consumption of resources and enabling the resources to be reasonably utilized.

Those having ordinary skills in the art can understand that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term "computer storage medium" includes volatile and nonvolatile, removable and non-removable media implemented in any method or technology for storing information such as computer-readable instructions, data structures, program modules or other data. The computer storage medium may include RAM, ROM, EEPROM, flash memory or other memory technologies, CD-ROM, Digital Versatile Disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer-readable instructions, data structures, program modules or other data in a modulated data signal such as a carrier wave or other transmission mechanism, and may include any information delivery medium.

The above is a detailed description of several embodiments of the present disclosure, but the present disclosure is not limited to the above embodiments. Those having ordinary skills in the art can also make various equivalent modifications or substitutions without departing from the protection scope of the present disclosure, and these equivalent modifications or substitutions are included in the scope defined by the claims of the present disclosure.

What is claimed is:

1. A data processing method, performed by a Network Data Analytics Function (NWDAF) network element, comprising:
receiving first request information, wherein the first request information is used to request data information corresponding to a first object;
receiving second request information, wherein the second request information is used to request data information corresponding to a second object, the first object and the second object are User Plane Function (UPF) network elements;
in response to presence of an intersection object between the first object and the second object, determining target data information which needs to be acquired from a server according to the intersection object; and
requesting the target data information from the server,
wherein the first request information is received prior to the second request information, and data information corresponding to the first object has been requested from the server according to the first request information;
determining target data information which needs to be acquired from a server according to the intersection object comprises:
in response to the second object being not the intersection object, determining a complement object of the intersection object in the second object; and
determining data information corresponding to the complement object as the target data information which needs to be acquired from the server.

2. The method of claim 1, wherein the first object is the intersection object, and the second object is a set of all objects of the same type as the first object;
determining a complement object of the intersection object in the second object comprises:
sending service query information to the server, wherein the service query information is used to query identification information of all objects of the same type as the first object;
receiving the identification information of all the objects of the same type as the first object sent by the server according to the service query information; and
determining a complement object of the intersection object in the second object according to identification information of the first object and the identification information of all the objects of the same type as the first object.

3. The method of claim 1, wherein the data processing method further comprises:
receiving first data information corresponding to the first object sent by the server;
receiving the target data information sent by the server;
determining second data information corresponding to the intersection object in the first data information; and
obtaining third data information corresponding to the second object according to the target data information and the second data information.

4. The method of claim 3, wherein both the first request information and the second request information request data prediction analytics;
the data processing method further comprises:
performing prediction processing on the first data information to obtain first prediction information;
performing prediction processing on the third data information to obtain second prediction information;
sending the first prediction information to an initiator of the first request information; and
sending the second prediction information to an initiator of the second request information.

5. The method of claim 1, wherein the first request information is received prior to the second request information, and data information corresponding to the first object has been requested from the server according to the first request information;
determining target data information which needs to be acquired from a server according to the intersection object comprises:
in response to the second object being the intersection object, determining that the target data information which needs to be acquired from the server is null.

6. The method of claim 5, wherein the data processing method further comprises:
receiving fourth data information corresponding to the first object sent by the server; and
determining fifth data information corresponding to the second object in the fourth data information.

7. The method of claim 6, wherein the first object is the same as the second object, the first request information requests to acquire data information corresponding to the first object at a first time interval, the second request information requests to acquire data information corresponding to the second object at a second time interval, and the first time interval is different from the second time interval;
determining fifth data information corresponding to the second object in the fourth data information comprises:
collecting fifth data information corresponding to the second object in the fourth data information with a ratio of the first time interval to the second time interval as a sampling ratio.

8. The method of claim 6, wherein both the first request information and the second request information request data prediction analytics;
the data processing method further comprises:
performing prediction processing on the fourth data information to obtain third prediction information;
performing prediction processing on the fifth data information to obtain fourth prediction information;
sending the third prediction information to the initiator of the first request information; and
sending the fourth prediction information to the initiator of the second request information.

9. The method of claim 1, wherein the first request information and the second request information are received simultaneously;
determining target data information which needs to be acquired from a server according to the intersection object comprises:
in response to the second object being the intersection object, determining the data information corresponding to the first object as the target data information which needs to be acquired from the server.

10. The method of claim 9, wherein the data processing method further comprises:
receiving the target data information sent by the server; and determining sixth data information corresponding to the second object in the target data information.

11. The method of claim 10, wherein the first object is the same as the second object, the first request information requests to acquire data information corresponding to the first object at a third time interval, the second request information requests to acquire data information corresponding to the second object at a fourth time interval, and the third time interval is different from the fourth time interval;
  determining sixth data information corresponding to the second object in the target data information comprises:
    collecting the sixth data information corresponding to the second object in the target data information with a ratio of the third time interval to the fourth time interval as a sampling ratio.

12. The method of claim 10, wherein both the first request information and the second request information request data prediction analytics;
  the data processing method further comprises:
    performing prediction processing on the target data information to obtain fifth prediction information;
    performing prediction processing on the sixth data information to obtain sixth prediction information;
    sending the fifth prediction information to the initiator of the first request information; and
    sending the sixth prediction information to the initiator of the second request information.

13. The method of claim 1, wherein the first request information and the second request information are received simultaneously;
  determining target data information which needs to be acquired from a server according to the intersection object comprises:
    in response to the second object being not the intersection object, determining a complement object of the intersection object in the second object; and
    determining data information corresponding to the first object and data information corresponding to the complement object as the target data information which needs to be acquired from the server.

14. The method of claim 13, wherein the data processing method further comprises:
  receiving the target data information sent by the server; and
  determining seventh data information corresponding to the first object and eighth data information corresponding to the second object in the target data information.

15. The method of claim 14, wherein both the first request information and the second request information request data prediction analytics;
  the data processing method further comprises:
    performing prediction processing on the seventh data information to obtain seventh prediction information;
    performing prediction processing on the eighth data information to obtain eighth prediction information;
    sending the seventh prediction information to the initiator of the first request information; and
    sending the eighth prediction information to the initiator of the second request information.

16. A Network Data Analytics Function (NWDAF) network element, comprising:
  a memory, a processor, and a computer program stored in the memory and runnable on the processor, wherein the computer program, when executed by the processor, causes the processor to perform a data processing method, comprising:
    receiving first request information, wherein the first request information is used to request data information corresponding to a first object;
    receiving second request information, wherein the second request information is used to request data information corresponding to a second object, the first object and the second object are User Plane Function (UPF) network elements;
    in response to presence of an intersection object between the first object and the second object, determining target data information which needs to be acquired from a server according to the intersection object; and
    requesting the target data information from the server,
    wherein the first request information is received prior to the second request information, and data information corresponding to the first object has been requested from the server according to the first request information;
    determining target data information which needs to be acquired from a server according to the intersection object comprises:
      in response to the second object being not the intersection object, determining a complement object of the intersection object in the second object; and
      determining data information corresponding to the complement object as the target data information which needs to be acquired from the server.

17. A non-transitory computer-readable storage medium, storing a computer-executable instruction which, when executed by a processor, causes the processor to perform a data processing method, performed by a Network Data Analytics Function (NWDAF) network element, comprising:
  receiving first request information, wherein the first request information is used to request data information corresponding to a first object;
  receiving second request information, wherein the second request information is used to request data information corresponding to a second object, the first object and the second object are User Plane Function (UPF) network elements;
  in response to presence of an intersection object between the first object and the second object, determining target data information which needs to be acquired from a server according to the intersection object; and
  requesting the target data information from the server,
  wherein the first request information is received prior to the second request information, and data information corresponding to the first object has been requested from the server according to the first request information;
  determining target data information which needs to be acquired from a server according to the intersection object comprises:
    in response to the second object being not the intersection object, determining a complement object of the intersection object in the second object; and
    determining data information corresponding to the complement object as the target data information which needs to be acquired from the server.

18. The method of claim 2, wherein the data processing method further comprises:
- receiving first data information corresponding to the first object sent by the server;
- receiving the target data information sent by the server;
- determining second data information corresponding to the intersection object in the first data information; and
- obtaining third data information corresponding to the second object according to the target data information and the second data information.

19. The method of claim 7, wherein both the first request information and the second request information request data prediction analytics;
- the data processing method further comprises:
    - performing prediction processing on the fourth data information to obtain third prediction information;
    - performing prediction processing on the fifth data information to obtain fourth prediction information;
    - sending the third prediction information to the initiator of the first request information; and
    - sending the fourth prediction information to the initiator of the second request information.

* * * * *